(12) United States Patent
Sundet (10) Patent No.: US 11,035,211 B1
(45) Date of Patent: Jun. 15, 2021

(54) SCALABLE TREATMENT SYSTEMS AND METHODS FOR AUTONOMOUS CHEMICAL TREATMENT

(71) Applicant: Well-Focused Technologies, LLC, Williston, ND (US)

(72) Inventor: Warren Sundet, Williston, ND (US)

(73) Assignee: WELL-FOCUSED TECHNOLOGIES, LLC, Williston, ND (US)

( * ) Notice: Subject to any disclaimer, the term of this patent is extended or adjusted under 35 U.S.C. 154(b) by 0 days.

(21) Appl. No.: 17/180,114

(22) Filed: Feb. 19, 2021

Related U.S. Application Data

(60) Provisional application No. 62/978,888, filed on Feb. 20, 2020.

(51) Int. Cl.
*E21B 43/25* (2006.01)
*F04B 49/03* (2006.01)
*F04B 49/06* (2006.01)
*F04B 13/02* (2006.01)
*C09K 8/02* (2006.01)

(52) U.S. Cl.
CPC .............. *E21B 43/25* (2013.01); *F04B 13/02* (2013.01); *F04B 49/03* (2013.01); *F04B 49/065* (2013.01); *C09K 8/02* (2013.01)

(58) Field of Classification Search
CPC .. E21B 43/25; F16B 2/12; F04B 49/03; F04B 13/02; C09K 8/02
See application file for complete search history.

(56) References Cited

U.S. PATENT DOCUMENTS

| | | | | | |
|---|---|---|---|---|---|
| 4,354,553 | A | * | 10/1982 | Hensley | E21B 41/02 166/250.05 |
| 4,716,932 | A | * | 1/1988 | Adams, Jr. | B01F 3/1271 137/565.29 |
| 4,830,112 | A | * | 5/1989 | Erickson | C09K 8/54 166/304 |
| 4,845,981 | A | * | 7/1989 | Pearson | B01F 15/00207 73/152.31 |
| 4,850,750 | A | * | 7/1989 | Cogbill | B01F 13/0035 406/82 |
| 5,209,298 | A | * | 5/1993 | Ayres | E21B 33/068 166/305.1 |
| 5,209,299 | A | * | 5/1993 | Ayres | E21B 33/068 166/305.1 |
| 5,209,301 | A | * | 5/1993 | Ayres | E21B 33/068 166/305.1 |

(Continued)

*Primary Examiner* — Patrick Hamo
(74) *Attorney, Agent, or Firm* — Kilpatrick Townsend & Stockton LLP (57) ABSTRACT

A system for chemical treatment of producing hydrocarbon wells and other equipment. In one example arrangement, a number of treatment fluids are stored in treatment fluid reservoirs, and a number of carrier fluids are stored in carrier fluid reservoirs. Each reservoir has an associated valve, such that the fluids can be selectively drawn from the reservoirs and pumped to a treatment target. The treatment fluid reservoirs may be connected to a treatment fluid manifold, and the carrier fluid reservoirs may be connected to a carrier fluid manifold. Fluids drawn from the reservoirs may be directed to a distribution manifold and delivered to specific treatment targets using valves on outlets of the distribution manifold.

18 Claims, 8 Drawing Sheets

(56) References Cited

U.S. PATENT DOCUMENTS

| | | | | |
|---|---|---|---|---|
| 5,308,583 A * | 5/1994 | Sanuki | G01N 30/34 | 137/565.33 |
| 5,515,920 A * | 5/1996 | Luk | E21B 43/267 | 166/280.1 |
| 5,637,208 A * | 6/1997 | Dourdeville | F04B 7/0007 | 137/565.13 |
| 5,897,781 A * | 4/1999 | Dourdeville | F04B 49/065 | 210/656 |
| 5,988,987 A * | 11/1999 | Wolcott | F04B 1/2042 | 417/269 |
| 6,120,175 A * | 9/2000 | Tewell | B01F 15/0445 | 366/140 |
| 6,193,402 B1 * | 2/2001 | Grimland | B01F 3/1221 | 366/14 |
| 6,228,153 B1 * | 5/2001 | Saitoh | B01D 19/0068 | 210/180 |
| 6,293,756 B1 * | 9/2001 | Andersson | F04B 11/0058 | 417/3 |
| 6,299,767 B1 * | 10/2001 | Dourdeville | B01D 15/166 | 210/101 |
| 6,648,072 B1 * | 11/2003 | Blanchard | E21B 37/06 | 166/312 |
| 6,904,784 B2 * | 6/2005 | Allington | B01D 15/12 | 73/23.35 |
| 7,389,787 B2 * | 6/2008 | Means | E21B 37/06 | 137/13 |
| 7,841,394 B2 * | 11/2010 | McNeel | E21B 43/30 | 166/90.1 |
| 8,795,493 B2 * | 8/2014 | Neyer | B01D 61/56 | 204/450 |
| 9,714,741 B2 * | 7/2017 | Sandidge | E21B 43/16 | |
| 9,744,477 B2 * | 8/2017 | Almeida | B01D 15/18 | |
| 9,770,678 B2 * | 9/2017 | Jackson | G01N 30/14 | |
| 10,751,642 B2 * | 8/2020 | Joudrey | F04B 49/22 | |
| 2015/0007987 A1 * | 1/2015 | Ayres | E21B 41/02 | 166/263 |
| 2019/0100444 A1 * | 4/2019 | Black | G05D 11/131 | |

* cited by examiner

SCALABLE TREATMENT SYSTEMS AND METHODS FOR AUTONOMOUS CHEMICAL TREATMENT

CROSS-REFERENCE TO RELATED APPLICATIONS

This application claims the benefit of U.S. Provisional patent application Ser. No. 62/978,888 filed Feb. 20, 2020, the entire contents of which are hereby incorporated by reference herein, for all purposes.

FIELD OF INVENTION

This disclosure relates generally to the field of chemical treatment systems for use with hydrocarbon producing wells and other equipment.

BACKGROUND OF THE INVENTION

Actively producing hydrocarbon wells incorporate pipe, pumps and other associated equipment to transfer fluid from the bottom of the well to the surface. Once on the surface, the fluid may be separated into component parts; for a typical oil well this may be oil, produced water, and natural gas. Due to the nature of the fluid in the well, and the conditions that exist between the surface and the bottom of the hole, significant problems and failures may occur. It is not unusual for pipe to develop leaks and pumps to cease pumping. The result is often lost revenue and costly repairs.

One method to help mitigate these problems, is to inject chemicals into the well with the goal that the chemicals will protect the pipe, pump and other downhole equipment. Over the years, since oil was first produced in the United States in 1859, numerous treatment chemicals and several treatment methods have been developed in an attempt to provide appropriate treatment. One treatment method that has been used extensively over the years and remains pervasive today is batch chemical treatment. The oil industry in the United States continues to make use of treater trucks to provide batch treatment to individual producing wells.

A treater truck is a large, expensive, heavy-duty truck with multiple tanks, each containing a required treatment chemical, and one large tank carrying a fluid, often either produced water or fresh water. The fluid in the large tank is used to flush the chemical from the top of the well at the surface, to the bottom of the well. In order to treat a given well, the treater truck connects a hose to a well pipe on the surface and then pumps flush water along with required chemicals into the pipe. Even though wells may often require chemicals to be present continuously in order to adequately protect the well, a treater truck cannot be at the well site 100% of the time, since it is also used to treat other wells at other locations.

In addition, treatment of a well via a treater truck is often cost prohibitive. This cost of having a treater truck come to a well may result in treatment of the well only being provided, for example, monthly, biweekly, or weekly rather than at the prescribed interval. The lack of timely treatment may lead to significant well problems and failures.

Besides being very expensive to purchase and costly to maintain, treater trucks have several other significant shortcomings. For example, treater trucks are inherently unreliable, as weather, dependability of the operator, equipment malfunctions and other problems may disrupt the planned treatment schedule. In addition, even when wells are treated on the correct schedule with treater trucks, operators may, due to time constraints, generalize the amount of chemical used for a group of wells, rather than treat each respective well with the specific amount of chemical that is actually prescribed. This may ultimately lead to more well failures.

Finally, the number of hydrocarbon wells has grown dramatically as the United States has become energy independent, and the use of treater trucks for well chemical treatment may not keep pace with the rapidly increasing number of producing wells. The oil industry has not demonstrated the ability to provide a suitable alternative.

SUMMARY

Embodiments of a scalable treatment system for autonomous chemical treatment are disclosed. The design of the system may make the implementation of a particular embodiment relevant to a multitude of applications. Applications may include, but are not limited to, chemical treatment of hydrocarbon wells, chemical treatment of surface tanks and other equipment related to the oil industry. Applications may include chemical treatment of processes associated with water treatment plants, sewage treatment plants, gas processing plants, and oil refineries. Other applications are contemplated. The design of the treatment system may enable significant flexibility in relation to the types of chemicals and total number of chemicals used in a particular embodiment. The design of the treatment system may enable significant flexibility in relation to the number of treatment targets and the types of treatment targets that may be treated in a particular embodiment.

In some embodiments, the system may be a scalable autonomous treatment system that may utilize a multitude of treatment chemicals to treat a multitude of producing wells.

One example embodiment is as follows.

The system may incorporate a treatment fluid reservoir which is fluidly connected to a treatment fluid manifold via a treatment fluid control valve. The treatment fluid control valve is controlled by a control unit. The treatment fluid control valve opens and closes to control the flow of treatment fluid into a treatment fluid manifold. The outlet of the treatment fluid manifold is fluidly connected to an inlet of a treatment fluid pump. The control unit controls the speed and flow of the treatment fluid pump. A flowmeter measures the flow of fluid into the treatment fluid pump. The outlet of the treatment fluid pump is fluidly connected to the inlet of a distribution manifold. A pressure sensor is fluidly connected to the inlet of the distribution manifold.

A carrier fluid reservoir is fluidly connected to a carrier fluid manifold via a carrier fluid control valve. The carrier fluid control valve is controlled by the control unit. The carrier fluid control valve opens and closes to control the flow of carrier fluid into the carrier fluid manifold. The outlet of the carrier fluid manifold is connected to an inlet of a carrier fluid pump. The control unit controls the speed and flow of the carrier fluid pump. A flowmeter measures the flow of fluid into the carrier fluid pump. The outlet of the carrier fluid pump is connected to the inlet of the distribution manifold.

The distribution manifold is fluidly connected to a treatment target control valve. The treatment target control valve is controlled by the control unit. The treatment target control valve opens and closes to control the flow of fluid from the outlet of the distribution manifold to a respective treatment target.

Based on a pre-determined treatment schedule and a predetermined chemical dosage, the control unit may control the operation of the system appropriately. The control unit may control the operation of the pumps and valves in order to mix the appropriate carrier fluid and treatment fluid in the appropriate proportions and deliver it to the appropriate treatment target.

A significant aspect of the system is the ability to be scalable across a range of treatment targets, treatment fluids and carrier fluids.

Other embodiments may have more, fewer, or different components than those described in the above example. Other aspects and advantages of the system will be apparent from the following description and the appended claims.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Throughout this description for the purposes of explanation, numerous specific details are set forth in order to provide a thorough understanding of the many aspects and embodiments disclosed herein. It will be apparent, however, to one skilled in the art that the many aspects and embodiments may be practiced without some of these specific details. In other instances, known structures and devices are shown in diagram or schematic form to avoid obscuring the underlying principles of the described aspects and embodiments.

FIG. 1-4. illustrate a scalable treatment system for autonomous chemical treatment in accordance with a first embodiment of the invention. The treatment system offers a scalable design that enables significant growth and expansion in relation to system features and characteristics. The treatment system may allow significant flexibility in terms of possible configuration for a particular application. This aspect of the system may enable the system to be applied and used across a broad range of industries. The design of the system may facilitate a multitude of options in relation to the configuration of an embodiment. Some of these options may include, the number and type of treatment fluids used, and the number of treatment targets treated. The system may enable a precise dose of each individual treatment fluid to be used for each respective treatment target. The system may provide a unique treatment schedule and unique treatment duration for each respective treatment target. Other options may include the number and type of carrier fluids used, as well as the ability to control the precise amount of carrier fluid provided to a treatment target during treatment.

Figure 1:
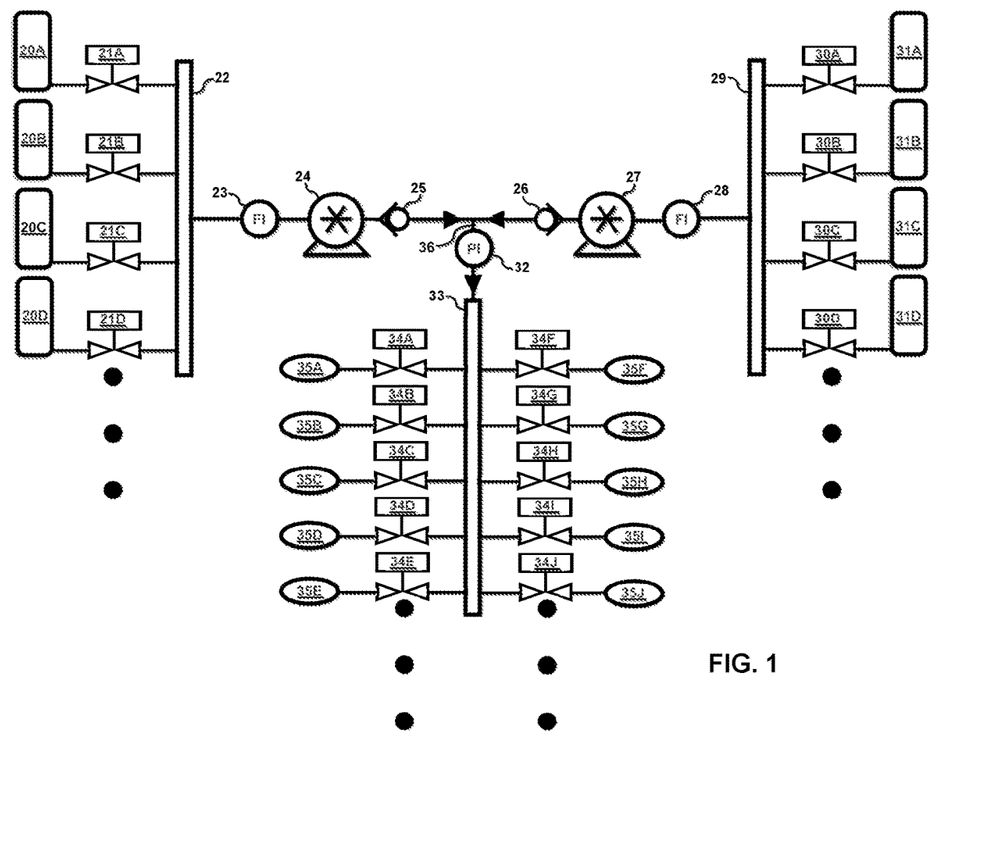
FIG. 1 illustrates a first embodiment of the treatment system.

As shown in FIG. 1, the treatment system may include a plurality of treatment fluid reservoirs 20A-20D. A treatment fluid reservoir may contain the treatment fluid that may be used by the system. It should be understood that the number of treatment fluid reservoirs 20A-20D depicted in FIG. 1 is shown by way of example and is not meant to imply a system minimum, maximum or any system limitation. A wide variety of treatment fluids may be used, for example a corrosion inhibitor, a scale inhibitor, a biocide, an oxygen scavenger, a hydrogen sulfide scavenger, hydrochloric acid, a surfactant, an emulsion breaker, bleach, or other fluids or combinations of fluids.

Each treatment fluid reservoir 20A-20D may be fluidly connected to the inlet of a treatment fluid control valve 21A-21D, respectively. It should be understood that the number of treatment fluid control valves 21A-21D depicted in FIG. 1 is shown by way of example and is not meant to imply a system minimum, maximum or any system limitation. In order to provide effective chemical treatment, the treatment system may use treatment fluids with solvents such as isopropyl alcohol, ethylene glycol, hydrochloric acid, methyl alcohol and xylene. Other solvents are contemplated. Due to the chemical composition of the treatment fluid, treatment fluid control valve 21A-21D may be degraded by contact with the treatment fluid. In order to minimize degradation of treatment fluid control valve 21A-21D, the wetted parts of the valves may be constructed with a material substantially impervious to the treatment fluid, for example polytetrafluoroethylene or polyvinylidene difluoride. Other material is contemplated.

As shown in FIG. 1, the outlet of treatment fluid control valve 21A-21D is fluidly connected to the inlet of a treatment fluid manifold 22. In order to minimize degradation of manifold 22 due to contact with the treatment fluid, the wetted parts of the manifold may be constructed with polytetrafluoroethylene or polyvinylidene difluoride. Other material is contemplated. The outlet of treatment fluid manifold 22 is fluidly connected to the inlet of flowmeter 23. In order to minimize degradation of flowmeter 23 due to contact with the treatment fluid, the wetted parts of the flowmeter may be constructed with polytetrafluoroethylene or polyvinylidene difluoride. Other material is contemplated.

The outlet of flowmeter 23 is fluidly connected to an inlet of treatment fluid pump 24. Treatment fluid pump 24 may incorporate wetted parts that are substantially impervious to the treatment fluid, which may minimize degradation due to contact with the treatment fluid. Material such as 316 Stainless Steel, Hastelloy® (an alloy containing primarily nickel, molybdenum, and chromium), Duplex 2205 Stainless Steel, polytetrafluoroethylene or polyvinylidene difluoride may be used. Other material is contemplated. A control device such as a variable frequency drive may be used to control the rotational power source for treatment fluid pump 24. A variable frequency drive enables a wide range of pump speeds and flow rates to be achieved. The rotational power sources for the pumps in the system may be electric motors, although other types of rotational power sources and other types of control devices are contemplated.

The outlet of treatment fluid pump 24 is fluidly connected to the inlet of treatment fluid check valve 25. In order to minimize degradation of check valve 25 due to contact with the treatment fluid, the wetted parts of the check valve may be constructed with 316 Stainless Steel, Hastelloy® or Duplex 2205 Stainless Steel. Other material is contemplated. The outlet of treatment fluid check valve 25 is fluidly connected to the inlet of distribution manifold 33. A pressure sensor 32 is fluidly connected to the inlet of the distribution manifold 33. Pressure sensor 32 may employ a flush diaphragm. In order to minimize degradation of pressure sensor 32 due to contact with the treatment fluid, the wetted parts of the sensor may be constructed with 316 Stainless Steel, Hastelloy® or Duplex 2205 Stainless Steel. Other material is contemplated.

The treatment system may include a number of carrier fluid reservoirs 31A-31D. Each carrier fluid reservoir may contain the carrier fluid that may be used by the system. It should be understood that the number of carrier fluid reservoirs 31A-31D depicted in FIG. 1 is shown by way of example and is not meant to imply a system minimum, maximum or any system limitation.

Each carrier fluid reservoir 31A-31D is fluidly connected to the inlet of a carrier fluid control valve 30A-30D, respectively. It should be understood that the number of carrier fluid control valves 30A-30D depicted in FIG. 1 is shown by way of example and is not meant to imply a system minimum, maximum or any system limitation. In order to provide effective chemical treatment, the treatment system may use carrier fluids such as produced water and fresh water. Other carrier fluids are contemplated. In order to minimize degradation of control valve 30A-30D due to contact the carrier fluid, the wetted parts of the valves may be constructed with a material substantially impervious to the carrier fluid, for example polytetrafluoroethylene or polyvinylidene difluoride. Other material is contemplated.

The outlet of carrier fluid control valve 30A-30D is fluidly connected to the inlet of a carrier fluid manifold 29. In order to minimize degradation of manifold 29 due to contact with the carrier fluid, the wetted parts of the manifold may be constructed with polytetrafluoroethylene or polyvinylidene difluoride. Other material is contemplated.

The outlet of carrier fluid manifold 29 is fluidly connected to the inlet of flowmeter 28. In order to minimize degradation of flowmeter 28 due to contact with the carrier fluid, the wetted parts of the flowmeter may be constructed with polytetrafluoroethylene or polyvinylidene difluoride. Other material is contemplated.

The outlet of flowmeter 28 is fluidly connected to an inlet of carrier fluid pump 27. Carrier fluid pump 27 may incorporate wetted parts that are substantially impervious to the carrier fluid, which may minimize degradation due to contact with the treatment fluid. Material such as 316 Stainless Steel, Hastelloy®, Duplex 2205 Stainless Steel, polytetrafluoroethylene or polyvinylidene difluoride may be used. Other material is contemplated. A control device such as a variable frequency drive may be used to control the rotational power source for carrier fluid pump 27. A variable frequency drive enables a wide range of pump speeds and flow rates to be achieved. Other types of rotational power sources and other types of control devices are contemplated. The outlet of carrier fluid pump 27 is fluidly connected to the inlet of treatment fluid check valve 26. In order to minimize degradation of check valve 26 due to contact with the treatment fluid, the wetted parts of the carrier fluid check valve may be constructed with 316 Stainless Steel, Hastelloy® or Duplex 2205 Stainless Steel. Other material is contemplated.

The outlet of carrier fluid check valve 26 is fluidly connected to the inlet of distribution manifold 33. In order to minimize degradation of distribution manifold 33 due to contact with the treatment fluid mixture, the wetted parts of the distribution manifold 33 may be constructed with 316 Stainless Steel, Hastelloy® or Duplex 2205 Stainless Steel. Other material is contemplated.

The outlets of the treatment fluid check valve 25 and the carrier fluid check valve 26 may be connected to a common outlet 36, which is also at the inlet of the distribution manifold 33.

The treatment system may be used for treating a number of treatment targets 35A-35J. It should be understood that the number of treatment targets 35A-35J depicted in FIG. 1 is shown by way of example and is not meant to imply a system minimum, maximum or any system limitation. The treatment targets 35A-35J may include producing wells, tanks, or other kinds of equipment.

Each treatment target 35A-35J is fluidly connected to the outlet of a treatment target control valve 34A-34J, respectively. It should be understood that the number of treatment target control valves 34A-34J depicted in FIG. 1 is shown by way of example and is not meant to imply a system minimum, maximum or any system limitation. The inlet of treatment target control valve 34A-34J is fluidly connected to the outlet of distribution manifold 33.

Overall supervisory control and operation of the system may be accomplished by a control unit 50. The treatment system may be controlled and supervised by a control unit 50. Control unit 50 may comprise any type of computer for enabling the various aspects of the disclosed embodiments. For example, control unit 50 may be an industrial automation controller, a programmable logic controller or other appropriate computing device. Control unit 50 may be comprised of various electronic devices such as relays, high speed counters, devices to measure voltage and current as well as devices to generate voltage and current for an electrical circuit. Control unit 50 may employ a Human Machine Interface which allows a certified user of the system to input data relating to system operation, as well as to review system data that is provided as output from the system. Control unit 50 may be capable of storing the software code which executes and is responsible for the overall operation of the system. Control unit 50 may store user-entered information relating to the static parameters associated with operation of the system. Parameters may include treatment target names, carrier fluid names, treatment fluid names, treatment schedules, unique treatment formulae for a respective treatment target, and other parameters which may be required for proper system operation. Other parameters are contemplated. Control unit 50 may have a user access control system which may control which system functions a given user may be allowed to access. Control unit 50 may be capable of storing a history of system operation for a predetermined period of time. Control unit 50 may enable a certified user of the system to review the stored data.

Figure 8:
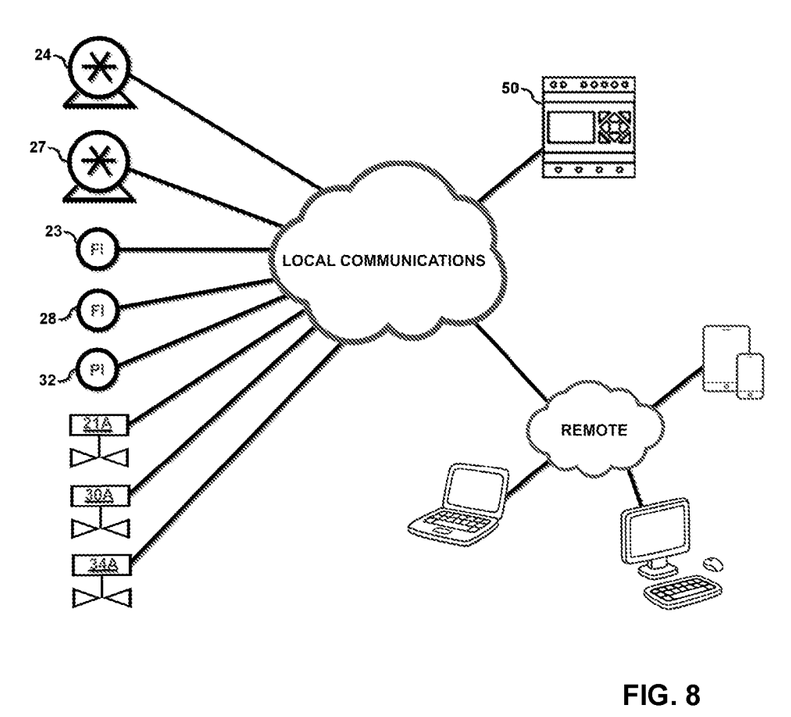
FIG. 8 illustrates communication between control unit, system components and remote devices.

As shown in FIG. 8, control unit 50 communicates with treatment fluid control valves 21A-21D. This communication may control the flow of a particular treatment fluid into treatment fluid manifold 22. Control unit 50 communicates with flowmeter 23. This communication may allow electrical pulses generated by flowmeter 23 to be counted by control unit 50. The number of pulses counted per unit time may be used by control unit 50 to determine the flow of treatment fluid for a specified period of time. Prior to this determination, a calibration procedure may have been performed that describes the mathematical relationship between the number of pulses counted by control unit 50 and the amount of flow through flowmeter 23 over a specified period of time. Control unit 50 communicates with treatment fluid pump 24. This may allow the speed and flow of treatment fluid pump 24 to be varied over a wide range.

As shown in FIG. 8, control unit 50 communicates with carrier fluid control valves 30A-30D. This communication may control the flow of a particular carrier fluid into carrier fluid manifold 29. Control unit 50 communicates with flowmeter 28. This communication may allow electrical pulses generated by flowmeter 28 to be counted by control unit 50. The number of pulses counted per unit time may be used by control unit 50 to determine the flow of treatment fluid for a specified period of time. Prior to this determination, a calibration procedure may have been performed that describes the mathematical relationship between the number of pulses counted by control unit 50 and the amount of flow through flowmeter 28 over a specified period of time. Control unit 50 communicates with carrier fluid pump 27. This may allow the speed and flow of carrier fluid pump 27 to be varied over a wide range. Control unit 50 communicates with pressure sensor 32. This communication may allow current generated by pressure sensor 32 to be measured by control unit 50. Prior to this determination, a calibration procedure may have been performed that describes the mathematical relationship between the amount of current measured by control unit 50 and the amount of pressure applied to pressure sensor 32.

As shown in FIG. 8, control unit 50 communicates with treatment target control valves 34A-34J. This communication may control the flow of a particular treatment mixture from distribution manifold 33 into treatment target 35A-35J.

Control unit 50 coordinates and supervises the autonomous operation of the system. Prior to initiation of a treatment sequence by control unit 50 certain system parameters are entered into the memory of control unit 50 by a certified system user. This may be accomplished via the Human Machine Interface, via remote access, or via some other predetermined mechanism. Required system parameters may include names of the contents of each carrier fluid reservoir, names of the contents of the treatment fluid reservoir, names for each respective treatment target. Other required system parameters may include scheduled treatment time, name of carrier fluids, amount of a respective carrier fluid used, treatment fluids used, amount of a respective treatment fluid used.

Prior to initiation of a treatment sequence, flowmeter 23 may be calibrated. The calibration procedure may involve flowing a known volume of fluid through the flowmeter and subsequently accumulating the total number of pulses received over a specific period of time. A calculation may then be accomplished that will allow control unit 50 to convert the number of pulses received from flowmeter 23 in a specific period of time into a value for flow, such as gallons per minute. Other units of measurement are contemplated. This calibration procedure may allow control unit 50 to measure the flow through treatment fluid pump 24.

Prior to initiation of a treatment sequence, flowmeter 28 may be calibrated. This procedure may involve flowing a known volume of fluid through the flowmeter and subsequently accumulating the total number of pulses received over a specific period of time. A calculation may then be accomplished that will allow control unit 50 to convert the number of pulses received from flowmeter 28 in a specific period of time into a value for flow, such as gallons per minute. Other units of measurement are contemplated. This calibration procedure may allow control unit 50 to measure the flow through carrier fluid pump 27.

Prior to initiation of a treatment sequence, pressure sensor 32 may be calibrated. This procedure may involve applying a known pressure in a liquid filled system to the diaphragm of pressure sensor 32 and measuring the amount of electrical current generated by pressure sensor 32. A calculation may then be accomplished that will allow control unit 50 to convert the amount of current measured from pressure sensor 32 into a value for pressure, such as pounds per square inch. Other units of measurement are contemplated. This calibration procedure may allow control unit 50 to measure the amount of pressure present at the inlet of distribution manifold 33.

In an example application, 1 gallon of treatment fluid from treatment fluid reservoir 20A and 2 gallons of treatment fluid reservoir 20B may be sequentially mixed with 40 gallons of carrier fluid from carrier fluid reservoir 31A to provide a treatment to treatment target 35A. A rinse fluid is stored in treatment reservoir 20D.

The following sequence may be followed in order to accomplish the example treatment application. Control unit 50 communicates with treatment fluid control valves 21A-21D to ensure that all valves are closed. Control unit 50 communicates with carrier fluid valves 30A-30D to ensure that all valves are closed. Control unit 50 communicates with treatment target valves 34A-34J to ensure that all valves are closed. Confirmation that all valves are closed allows the sequence to continue. Control unit 50 opens carrier fluid valve 30A and starts carrier fluid pump 27 while at the same time measuring the fluid pressure present at the inlet of distribution manifold 33. Pressure sensor 32 is used for this measurement. As carrier fluid pump 27 continues to run, control unit 50 monitors the pressure present at the inlet of distribution manifold 33. When the pressure reaches a predetermined value, control unit 50 stops carrier fluid pump 27, closes carrier fluid valve 30A and continues to monitor the pressure at the inlet of distribution manifold 33. The pressure is monitored for a predetermined time. The intent of monitoring the pressure is to determine if the system has any leaks. A leak, as detected, with the control unit 50, by a drop in pressure over a predetermined period of time, results in the treatment sequence being aborted by the control unit 50. When there is no evidence of a leak detected by the control unit 50, the treatment sequence continues.

Control unit 50 opens treatment target valve 34A, allowing treatment target 35A to be fluidly connected to distribution manifold 33. Control unit 50 opens carrier fluid valve 30A. This allows fluid from carrier fluid reservoir 31A to flow into carrier fluid manifold 29. After a predetermined amount of time has elapsed, control unit 50 starts carrier fluid pump 27. Carrier fluid pump 27 may be run at a constant, predetermined speed. Fluid begins to flow from carrier fluid reservoir 31A to treatment target 35A. As carrier fluid begins to flow, control unit 50 opens treatment fluid valve 21A. This allows treatment fluid from treatment fluid reservoir 20A to flow into treatment fluid manifold 22. After a predetermined amount of time has elapsed, control unit 50 starts treatment fluid pump 24. Treatment fluid pump 24 may be run at a constant, predetermined speed. Fluid begins to flow from treatment fluid reservoir 20A to treatment target 35A. The treatment fluid from treatment fluid reservoir 20A and the carrier fluid from carrier fluid reservoir 31A are mixed as they enter the inlet of distribution manifold 33. It should be noted that carrier fluid check valve 26 prohibits any fluid from flowing back into carrier fluid manifold 29. Treatment fluid check valve 25 prohibits any fluid from flowing back into treatment fluid manifold 22.

The flow rate of carrier fluid pump 27 and the flow rate of treatment fluid pump 24 are set, automatically by the control unit 50 or manually through user input to the control unit 50, so that that the total run time for carrier fluid pump 27 will routinely be longer than the total run time of treatment fluid pump 24.

While carrier fluid pump 27 is running, control unit 50 monitors the pulses from flowmeter 23. When the total pulses accumulated from flowmeter 23 reaches an amount equal to the required 1 gallon from treatment fluid reservoir 20A, control unit 50 stops treatment fluid pump 24 and closes treatment fluid control valve 21A. In order to minimize the likelihood of treatment fluids mixing with each other, a rinse fluid is used to rinse treatment fluid manifold 22 between the flow of each respective chemical that is being used. In this example, treatment reservoir 20D contains a rinse fluid. Prior to flowing the treatment fluid from treatment reservoir 20B, the system is rinsed. Control unit 50 opens treatment fluid valve 21D. This allows rinse fluid, from treatment fluid reservoir 20D to flow into treatment fluid manifold 22. After a predetermined amount of time has elapsed, control unit 50 starts treatment fluid pump 24. Treatment fluid pump 24 may run at a constant, predetermined speed. When a predetermined amount of time has elapsed, control unit 50 stops treatment fluid pump 24 and closes treatment fluid control valve 21D.

As carrier fluid continues to flow, control unit 50 opens treatment fluid valve 21B. The opening of the treatment fluid valve 21B allows treatment fluid from treatment fluid reservoir 20B to flow into treatment fluid manifold 22. After a predetermined amount of time has elapsed, control unit 50 starts treatment fluid pump 24. Treatment fluid pump 24 may be run at a constant, predetermined speed. Fluid begins to flow from treatment fluid reservoir 20B to treatment target 35A. The treatment fluid from treatment fluid reservoir 20B and the carrier fluid from carrier fluid reservoir 31A are mixed as they enter the inlet of distribution manifold 33.

While carrier fluid pump 27 is running, control unit 50 monitors the pulses from flowmeter 23. When the total pulses accumulated from flowmeter 23 reaches an amount equal to the required 2 gallons from treatment fluid reservoir 20B, control unit 50 stops treatment fluid pump 24 and closes treatment fluid control valve 21B. Before ending the treatment sequence, the system is rinsed. Control unit 50 opens treatment fluid valve 21D. The opening of the treatment fluid valve 21D allows rinse fluid, from treatment fluid reservoir 20D to flow into treatment fluid manifold 22. After a predetermined amount of time has elapsed, control unit 50 starts treatment fluid pump 24. Treatment fluid pump 24 runs at a constant, predetermined speed. When a predetermined amount of time has elapsed, control unit 50 stops treatment fluid pump 24 and closes treatment fluid control valve 21D.

Control unit 50 monitors the pulses from flowmeter 28. When the total pulses accumulated from flowmeter 28 reaches an amount equal to the prescribed 40 gallons, control unit 50 stops carrier fluid pump 27, and closes carrier fluid control valve 30A.

The previous example serves as an example of some aspects of a treatment system. The example and associated operational features are not meant to imply any limitation or other system restriction.

FIG. 1 illustrates a generic embodiment of the treatment system. The treatment targets may consist of a multitude of targets with numerous target types and characteristics.

Figure 2:
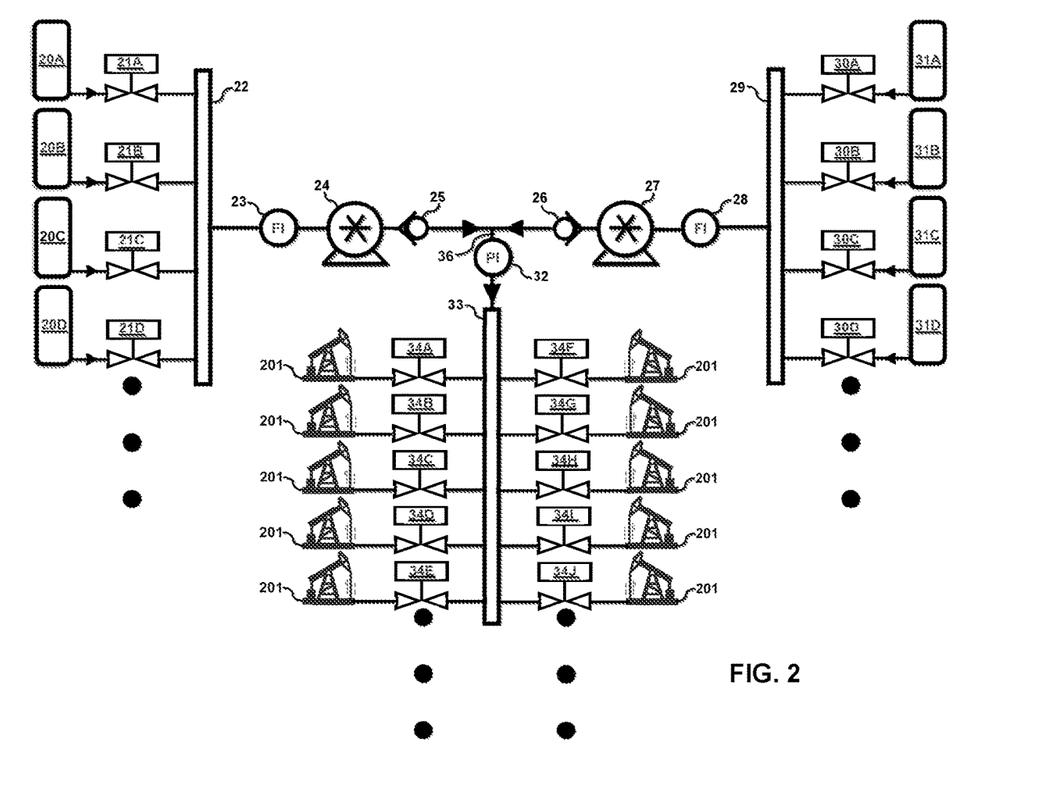
FIG. 2 illustrates the treatment system as it could be configured to treat producing hydrocarbon wells.

FIG. 2 illustrates the treatment system as it may be used to provide chemical treatment for producing hydrocarbon wells 201. The system may support a multitude of hydrocarbon wells and may provide a wide range of choices for treatment fluids, carrier fluids, treatments schedules and unique treatment regimens for each respective well.

Figure 3:
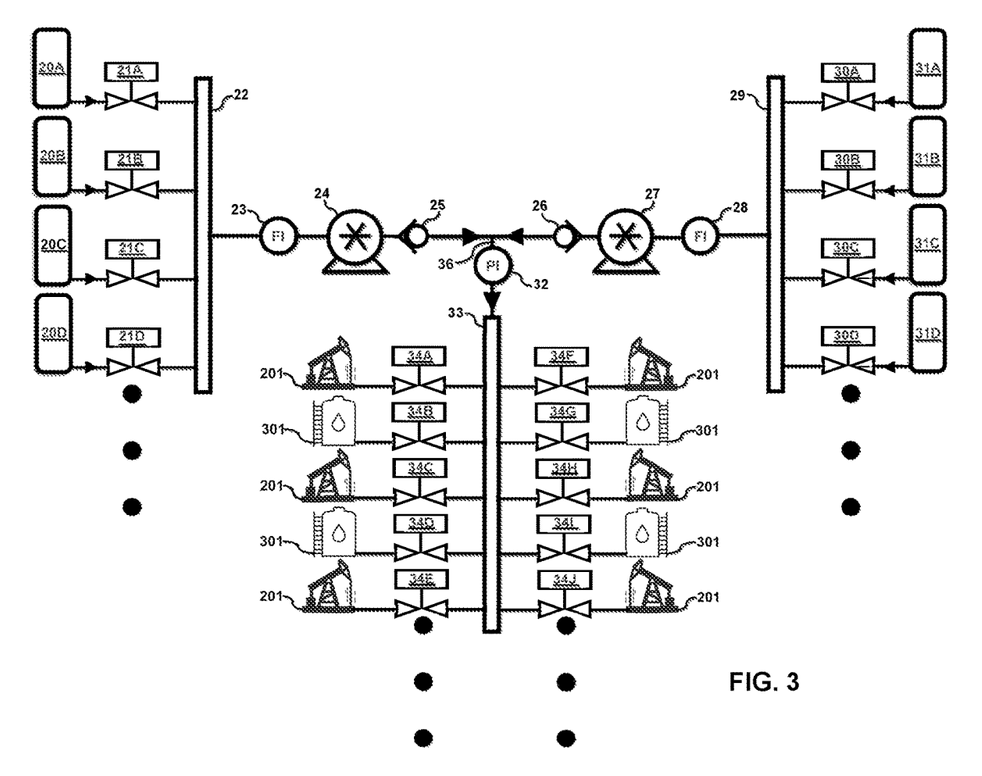
FIG. 3 illustrates the treatment system as it could be configured to treat producing hydrocarbon wells and tanks of fluid.

FIG. 3 illustrates the treatment system as it may be used on a large hydrocarbon well site. The system may not be limited to treating only wells, but may have the ability to wells, tanks 301, and ancillary equipment concurrently.

Figure 4:
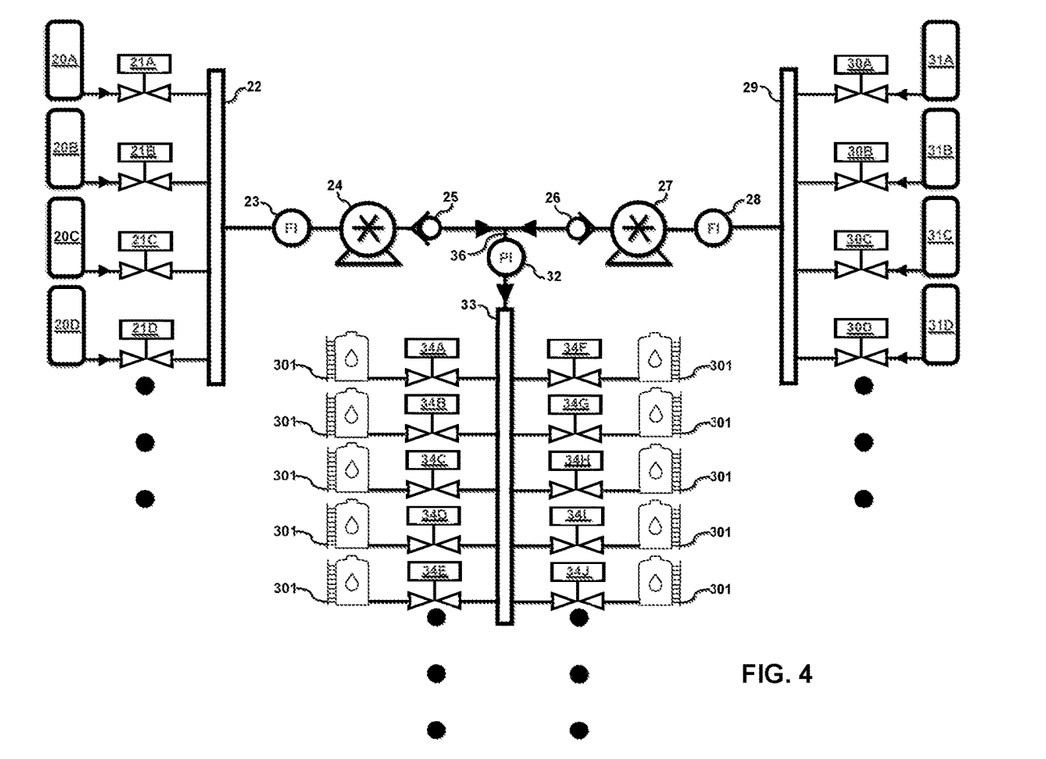
FIG. 4 illustrates the treatment system as it could be configured to treat tanks of fluid.

FIG. 4 illustrates the treatment system as it may be used on a large hydrocarbon well site that does not require producing wells to be treated but only treats tanks 301 and ancillary equipment.

Figure 5:
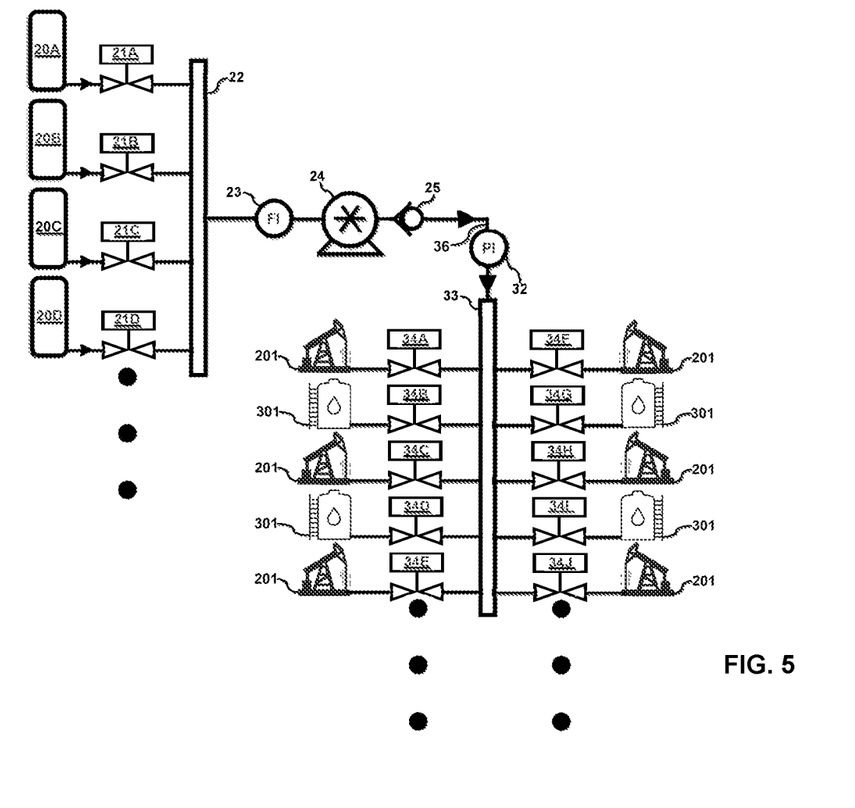
FIG. 5 illustrates the treatment system as it could be configured to treat producing hydrocarbon wells and tanks of fluid with only treatment fluid.

FIG. 5 illustrates another embodiment that can be used to treat producing hydrocarbon wells, tanks, and ancillary equipment with treatment fluid and no carrier fluid.

Figure 6:
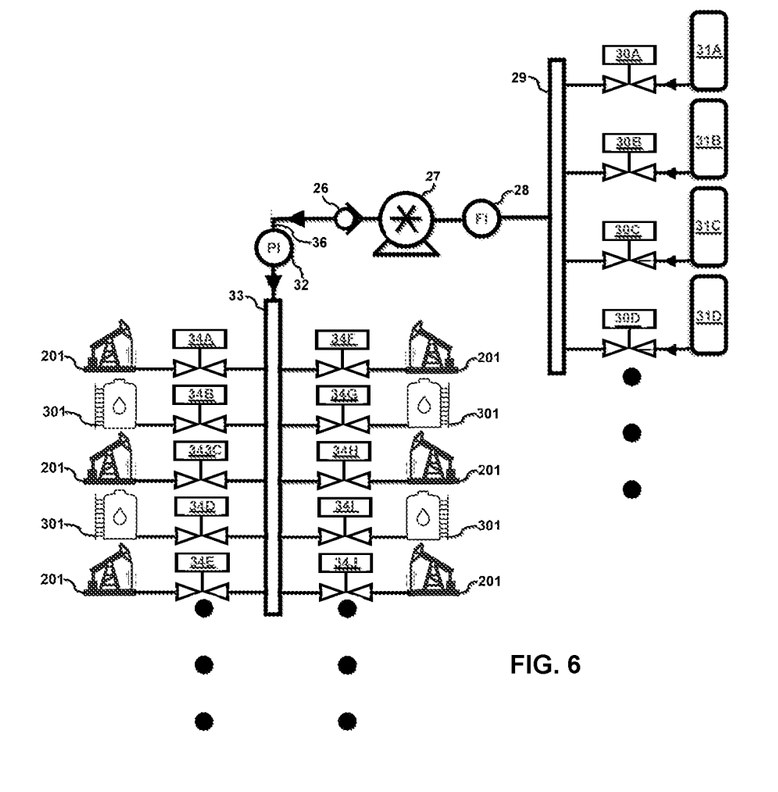
FIG. 6 illustrates the treatment system as it could be configured to treat producing hydrocarbon wells and tanks of fluid with only carrier fluid.

FIG. 6 illustrates another embodiment that can be used to treat producing hydrocarbon wells, tanks, and ancillary equipment with carrier fluid and no treatment fluid.

Figure 7:
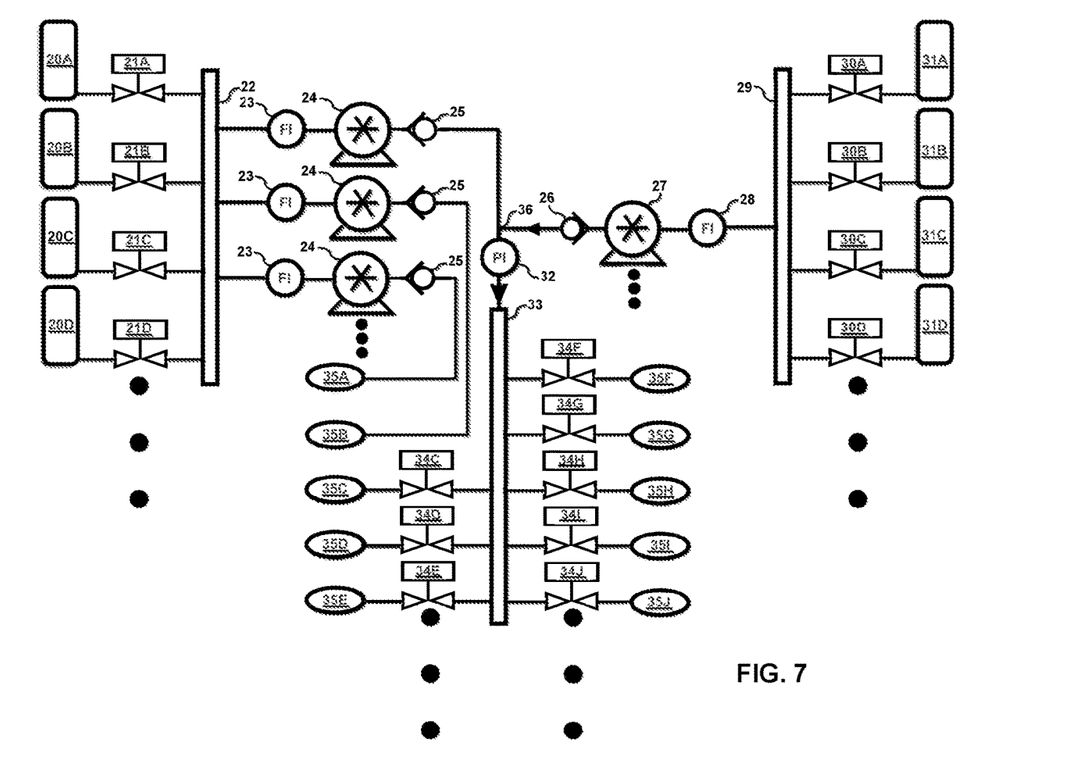
FIG. 7 illustrates the treatment system as it could be configured to treat multiple treatment targets, while including multiple treatment fluid pumps and multiple carrier fluid pumps.

FIG. 7 illustrates another embodiment that could be configured to treat a multitude of treatment targets, using multiple treatment fluid pumps and multiple carrier fluid pumps.

FIG. 8 illustrates communication between the control unit, local system components and between the control unit and users accessing the system remotely with devices which may include personal computers, cell phones and tablet devices. Other devices are contemplated.

While embodiments have been described above, it is to be understood that the described embodiments are given by way of example and not limitation, and that many variations are possible within the scope of the attached claims. For example, components may be arranged in any workable order. In one example rearrangement, flow meters such as flow meter 23 may be placed downstream of their respective pumps, such as pump 24. In other embodiments, different kinds of components may be used. For example, intelligent flow meters may be used that report the amount of fluid that has passed through them, rather than simply providing pulses that would need to be interpreted by control unit 50. In another example, positive displacement pumps may be used, and may eliminate the need for flow meters at all. Many other variations are possible.

The underlying premise for the system design is to provide maximum versatility and flexibility, particularly in relation to the types of chemicals that may be employed, as well as the number and types of entities that may be treated. In keeping with the intent of the design, embodiments of the system may be relevant to the following application environments, all relating to chemical and carrier fluid injection.

Oil Pipelines
Gas Pipelines
Water Pipelines
Municipal Water Treatment Plants
Municipal Sewage Treatment Plants
Natural Gas Plants
Oil Refineries
Chemical Manufacturing Plants
Manufacturing Plants
Food Processing Plants
Mining
Mining Process Plants
Mining Refineries
Coal-Powered Power Plants
Natural Gas-Powered Power Plants
Combined-Cycle Power Plants
Cooling Towers for All of the Industries Above
Cooling Towers for Commercial Buildings It should be noted that the treatment system has numerous other features that would be well understood by someone familiar with the field. Features may include but are not limited to error handling, pump calibration, flow meter calibration, pressure sensor calibration, troubleshooting. Other features are contemplated.

What is claimed is:

1. A treatment system for autonomous chemical treatment, the system comprising:
   at least one treatment fluid reservoir;
   at least one treatment fluid valve, one treatment fluid valve respectively for each treatment fluid reservoir, each treatment fluid valve operable to enable and disable fluid flow from its respective treatment fluid reservoir to an outlet;
   a treatment fluid pump;
   at least two carrier fluid reservoirs;
   a carrier fluid manifold;
   at least two carrier fluid valves, one carrier fluid valve respectively for each carrier fluid reservoir, each carrier fluid valve operable to enable and disable fluid flow from its respective carrier fluid reservoir to the carrier fluid manifold;
   a carrier fluid pump positioned to pump carrier fluid from the carrier fluid manifold to the outlet;
   a distribution manifold positioned to receive fluids from the outlet;
   at least two target control valves coupled to the distribution manifold, wherein each target control valve is operable to enable or disable fluid delivery from the distribution manifold to a respective treatment target; and
   a control unit coupled to the at least one treatment fluid valve, the treatment fluid pump, the at least two carrier fluid valves, the at least two target control valves, and the carrier fluid pump, the control unit configured to open and close the at least one treatment fluid valve, the at least two carrier fluid valves, and the at least two target control valves, and to operate the treatment fluid pump and the carrier fluid pump to sequentially deliver predetermined quantities of treatment fluid and carrier fluid to the outlet.

2. The treatment system for autonomous chemical treatment of claim 1, wherein the system comprises at least two treatment fluid reservoirs and at least two treatment fluid valves, and the system further comprises a treatment fluid manifold positioned to receive fluids from the treatment fluid reservoirs and direct the fluids to the outlet.

3. The treatment system for autonomous chemical treatment of claim 2, further comprising a treatment fluid flow meter configured to measure a quantity of treatment fluid delivered to the outlet and to indicate the quantity to the control unit.

4. The treatment system for autonomous chemical treatment of claim 3, further comprising a carrier fluid flow meter positioned to measure a quantity of carrier fluid delivered to the outlet and to indicate the quantity to the control unit.

5. The treatment system for autonomous chemical treatment of claim 4, wherein each treatment fluid valve and each carrier fluid valve is independently controllable by the control unit.

6. The treatment system for autonomous chemical treatment of claim 5, further comprising a treatment fluid check valve positioned and configured to prevent flow of fluid from the outlet toward the treatment fluid reservoirs.

7. The treatment system for autonomous chemical treatment of claim 6, further comprising a carrier fluid check valve positioned and configured to prevent flow of fluid from the outlet toward the carrier fluid reservoirs.

8. The treatment system for autonomous chemical treatment of claim 7, further comprising a pressure sensor positioned at the outlet and connected to the control unit, wherein the pressure sensor is configured to measure a fluid pressure at the outlet and to indicate the pressure to the control unit.

9. The treatment system of claim 1, wherein the target control valves are independently controllable by the control unit.

10. A method of chemically treating a number of treatment targets, the method comprising:
    receiving a specification of amounts of one or more treatment fluids to be delivered to a number of treatment targets from one or more treatment fluid reservoirs; and
    for each specified treatment fluid amount, under control of a computerized control unit:
      opening a treatment fluid valve associated with a specific one of the one or more treatment fluid reservoirs;
      opening a target control valve associated with a specific one of the treatment targets;
      pumping treatment fluid from the specific treatment fluid reservoir through the open treatment fluid valve, into an inlet of a distribution manifold, out of an outlet of the distribution manifold through the open target control valve, and to the specified treatment target;
    receiving a specification of amounts of one or more carrier fluids to be delivered to the number of treatment targets from one or more carrier fluid reservoirs; and
    for each specified carrier fluid amount, under control of the computerized control unit:
      opening a carrier fluid valve associated with a specific one of the carrier fluid reservoirs;
      opening a target control valve associated with a specific one of the treatment targets; and
      pumping carrier fluid from the specific carrier fluid reservoir through the open carrier fluid valve, into a carrier fluid manifold, out of the carrier fluid manifold, into the inlet of the distribution manifold, out of an outlet of the distribution manifold through the open target control valve, and to the specified treatment target.

11. The method of claim 10, wherein the method comprises receiving a specification of amounts of at least two treatment fluids to be delivered to a number of treatment targets from at least two treatment fluid reservoirs, and the method further comprises, for each specified treatment fluid amount, pumping treatment fluid into a treatment fluid manifold and out of the treatment fluid manifold.

12. The method of claim 11, wherein the method comprises receiving a specification of amounts of at least two carrier fluids to be delivered to a number of treatment targets from at least two carrier fluid reservoirs, and the method further comprises, for each specified carrier fluid amount, pumping carrier fluid into a carrier fluid manifold and out of the carrier fluid manifold.

13. The method of claim 12, further comprising closing the open treatment fluid valve.

14. The method of claim 13, further comprising closing the open carrier fluid valve.

15. The method of claim 14, further comprising closing the open target control valve.

16. A treatment system for autonomous chemical treatment, the system comprising:
- a distribution manifold;
- at least one treatment fluid reservoir;
- at least one treatment fluid valve, one treatment fluid valve respectively for each treatment fluid reservoir, each treatment fluid valve operable to enable and disable fluid flow from its respective treatment fluid reservoir to the distribution manifold;
- a treatment fluid pump;
- at least two target control valves coupled to the distribution manifold, each target control valve operable to enable or disable fluid delivery from the distribution manifold to a respective treatment target;
- at least one carrier fluid reservoir;
- at least one carrier fluid valve coupled to the control unit, one carrier fluid valve respectively for each carrier fluid reservoir, each carrier fluid valve operable to enable and disable fluid flow from its respective carrier fluid reservoir to the distribution manifold; and
- a control unit coupled to the at least one treatment fluid valve, the treatment fluid pump, the at least one carrier fluid valve, and the at least two target control valves, the control unit configured to open and close the at least one treatment fluid valve and the at least two target control valves and to operate the treatment fluid pump to sequentially deliver predetermined quantities of treatment fluid to the treatment targets.

17. The treatment system of claim 16, wherein the system comprises at least two treatment fluid reservoirs, and the system further comprising a treatment fluid manifold.

18. The treatment system of claim 17, further comprising:
- a carrier fluid pump; and
- wherein the control unit is configured to open and close the at least one carrier fluid valve and the at least one target control valve and to operate the carrier fluid pump to sequentially deliver predetermined quantities of carrier fluid to the treatment targets.

* * * * *